US007711791B2

(12) United States Patent
DuVall et al.

(10) Patent No.: US 7,711,791 B2
(45) Date of Patent: May 4, 2010

(54) USING MULTIPLE MEDIA PLAYERS TO INSERT DATA ITEMS INTO A MEDIA STREAM OF A STREAMING MEDIA

(75) Inventors: Mark DuVall, Torrance, CA (US); Alan Gilbert, Inglewood, CA (US)

(73) Assignee: Clear Channel Management Services, Inc., San Antonio, TX (US)

( * ) Notice: Subject to any disclaimer, the term of this patent is extended or adjusted under 35 U.S.C. 154(b) by 1111 days.

(21) Appl. No.: 10/183,068

(22) Filed: Jun. 26, 2002
(Under 37 CFR 1.47)

(65) Prior Publication Data
US 2004/0003102 A1    Jan. 1, 2004

(51) Int. Cl.
*G06F 15/16* (2006.01)
(52) U.S. Cl. .................. 709/217; 709/203; 709/219; 709/231
(58) Field of Classification Search .............. 709/231, 709/203, 217, 219; 455/3.01, 414.1; 705/1, 705/14, 42
See application file for complete search history.

(56) References Cited

U.S. PATENT DOCUMENTS

| | | | | |
|---|---|---|---|---|
| 5,311,423 | A * | 5/1994 | Clark | 705/8 |
| 5,412,416 | A * | 5/1995 | Nemirofsky | 725/36 |
| 6,317,761 | B1 * | 11/2001 | Landsman et al. | 715/513 |
| 6,587,127 | B1 * | 7/2003 | Leeke et al. | 715/765 |
| 6,687,737 | B2 * | 2/2004 | Landsman et al. | 709/203 |
| 6,791,579 | B2 * | 9/2004 | Markel | 715/719 |
| 6,859,838 | B1 * | 2/2005 | Puranik et al. | 709/231 |
| 6,950,623 | B2 * | 9/2005 | Brown et al. | 455/3.01 |
| 7,020,704 | B1 * | 3/2006 | Lipscomb et al. | 709/226 |
| 7,054,863 | B2 * | 5/2006 | Lasensky et al. | 707/9 |
| 7,155,663 | B2 * | 12/2006 | Landsman et al. | 715/200 |
| 7,281,199 | B1 * | 10/2007 | Nicol et al. | 715/203 |
| 7,376,414 | B2 | 5/2008 | Engstrom | |
| 2002/0019978 | A1 * | 2/2002 | Terretta | 725/34 |
| 2002/0056123 | A1 * | 5/2002 | Liwerant et al. | 725/87 |
| 2002/0063727 | A1 * | 5/2002 | Markel | 345/661 |
| 2002/0077900 | A1 * | 6/2002 | Thompson et al. | 705/14 |
| 2002/0082730 | A1 * | 6/2002 | Capps et al. | 700/94 |
| 2002/0083091 | A1 * | 6/2002 | Pulier et al. | 707/501.1 |
| 2002/0104096 | A1 * | 8/2002 | Cramer et al. | 725/113 |
| 2002/0133247 | A1 * | 9/2002 | Smith et al. | 700/94 |
| 2002/0147840 | A1 * | 10/2002 | Mutton et al. | 709/239 |
| 2003/0004793 | A1 * | 1/2003 | Feuer et al. | 705/14 |
| 2003/0061280 | A1 * | 3/2003 | Bulson et al. | 709/203 |
| 2003/0061607 | A1 * | 3/2003 | Hunter et al. | 725/32 |
| 2004/0019497 | A1 * | 1/2004 | Volk et al. | 705/1 |
| 2004/0051812 | A1 * | 3/2004 | Hayward | 348/460 |

FOREIGN PATENT DOCUMENTS

WO    WO 2008/021236 A2    2/2008
WO    WO 2008/021239 A2    2/2008

* cited by examiner

*Primary Examiner*—William C Vaughn, Jr.
*Assistant Examiner*—Kristie D Shingles
(74) *Attorney, Agent, or Firm*—Alan Carlson; Andrews Kurth LLP

(57) ABSTRACT

A method, apparatus and article of manufacture for processing a content stream at a client computer, the method comprising displaying a tagged content stream that was received from a media source by using a first media player, wherein the first media player is embedded in a Web page; and, when the first media player receives notification that a tag was found, muting the first media player; and displaying an untagged content stream by using a second media player, wherein the second media player is embedded in the Web page.

15 Claims, 10 Drawing Sheets

USING MULTIPLE MEDIA PLAYERS TO INSERT DATA ITEMS INTO A MEDIA STREAM OF A STREAMING MEDIA

FIELD OF THE INVENTION

This invention relates in general to computer implemented systems, and more particularly, to a technique of using multiple media players to insert data items into a media stream of streaming media.

DESCRIPTION OF RELATED ART

The Internet is a vast collection of global-spanning networks that communicate with each other by using protocols, such as the Transmission Control Protocol (TCP) and the Internet Protocol (IP). Via its networks, the Internet enables many computers, located at different sites around the world, to access information from each other.

The World Wide Web (i.e., the "WWW" or the "Web") is the fastest growing part of the Internet. The Web contains Web pages that incorporate text, graphics, sound, animation, and other multimedia elements. Some Web pages are formatted in a language called HyperText Markup Language (HTML). Hypertext links connect the Web pages to each other, and to any other pages, graphics, binary files, or multimedia files.

Web pages are also formatted in a language called Extensible Markup Language (XML). XML is independent of any platform, vendor, or application. Therefore, XML can be used to exchange information, without regard to the system that the information is coming from or going to. In addition, XML enables the exchange of information across different languages.

The Web works within a client/server model. Web client software runs on the Web client computers, and Web server software runs on the Web server computer. Web client software—known as the Web browser—interacts with both the user and the Web server software. In particular, the Web browser receives a Universal Resource Locator (URL) request from a user. The URL is a unique identifier for requested information (e.g., a Web page, a document, or an object). The Web browser then sends the URL request to the Web server software using Hypertext Transfer Protocol (HTTP). In response to the URL request, the Web server software locates and returns the requested information to the Web browser.

One of the most exciting aspects of the Web is the multimedia content. There are two techniques for delivering multimedia over the Internet. The first technique involves downloading multimedia files from a server, and storing the files on the client computer. Compressed formats are the most popular form of multimedia downloads.

The second technique involves streaming multimedia. Unlike the download technique, the streaming multimedia is not stored on the client computer. The streaming technology allows a user to play sounds, music, and video on the Web client computer while the Web server computer is sending the file. Accordingly, the user does not have to wait until the entire multimedia file is downloaded before listening to and/or viewing the media. At the Web client computer, media players are required to play the streaming multimedia. Such multimedia may include Internet radio, music and videos.

Many multimedia content providers (e.g., Internet radio stations) seek to generate revenue by selling advertising time to Internet advertisement providers. In turn, the advertisement providers seek to increase their advertising revenues by targeting certain advertisements to selected Internet users who are likely to purchase the advertiser's product. Such targeting may be based on variables such as gender, age, geographic location, etc.

For Internet radio, these targeted advertisements can be directly inserted into the streaming audio before the media player displays the stream to the user. This advertisement insertion can be performed at the client computer when the client computer has certain software applications. Currently, users are required to download special advertisement insertion software to their client computers.

Such download requirements present a problem for users that listen to Internet radio while at work because many employers prohibit their employees from downloading software onto company owned computers. Thus, there is a need for a technique of advertisement insertion at the client computer that does not require a user to download advertisement insertion software.

SUMMARY OF THE INVENTION

To overcome the limitations in the prior art described above, and to overcome other limitations that will become apparent upon reading and understanding the present specification, the present invention discloses a method, apparatus, and article of manufacture for processing a content stream at a client computer.

According to one embodiment of the present invention, a tagged content stream that was received from a media source is displayed at the client computer by using a first media player. The first media player is embedded in a Web page. When the first media player receives notification that a tag was found, the first media player is muted. Then an untagged content stream that contains data items is displayed by using a second media player. The second media player is embedded in the Web page. In one embodiment of the present invention, when the second media player receives notification that the untagged content has completed, the second media player is muted. The tagged content stream that was received from the media source is then displayed by using the first media player.

In a further embodiment of the present invention, the untagged content stream is received by a third instance of the media player. The third instance of the media player stores the untagged content stream in a cache connected to the client computer. When the first media player receives notification that a tag was found, the first media player is muted. Then the untagged content stream that was received from the cache is displayed by using the second instance of the media player.

In another embodiment of the present invention, registration information is collected from a user. A spot list is created by using the collected registration information. The untagged content stream contains one or more targeted data items that were selected from the spot list.

The above-described invention has utility for using multiple media players embedded in a Web page for the purpose of inserting an untagged content stream (e.g., advertisements) into a tagged content stream (e.g., radio station content) seamlessly, without media buffering. Such insertion is combined with collecting user registration information (e.g., demographic information) for targeting the untagged content stream (e.g., advertisements) to a particular user.

BRIEF DESCRIPTION OF THE DRAWINGS

Referring now to the drawings in which like reference numbers represent corresponding parts throughout.

DETAILED DESCRIPTION

In the following description of embodiments of the invention, reference is made to the accompanying drawings which form a part hereof, and which is shown by why of illustration, a specific embodiment in which the invention may be practiced. It is to be understood that other embodiments may be utilized as structural changes may be made without departing from the scope of the present invention.

This invention is comprised of a collection of components, which will be referred to herein as the "ThinClient System." It is to be understood that these components may be combined in many different ways to form a variety of combinations within the scope of the invention.

Overview

Figure 1:
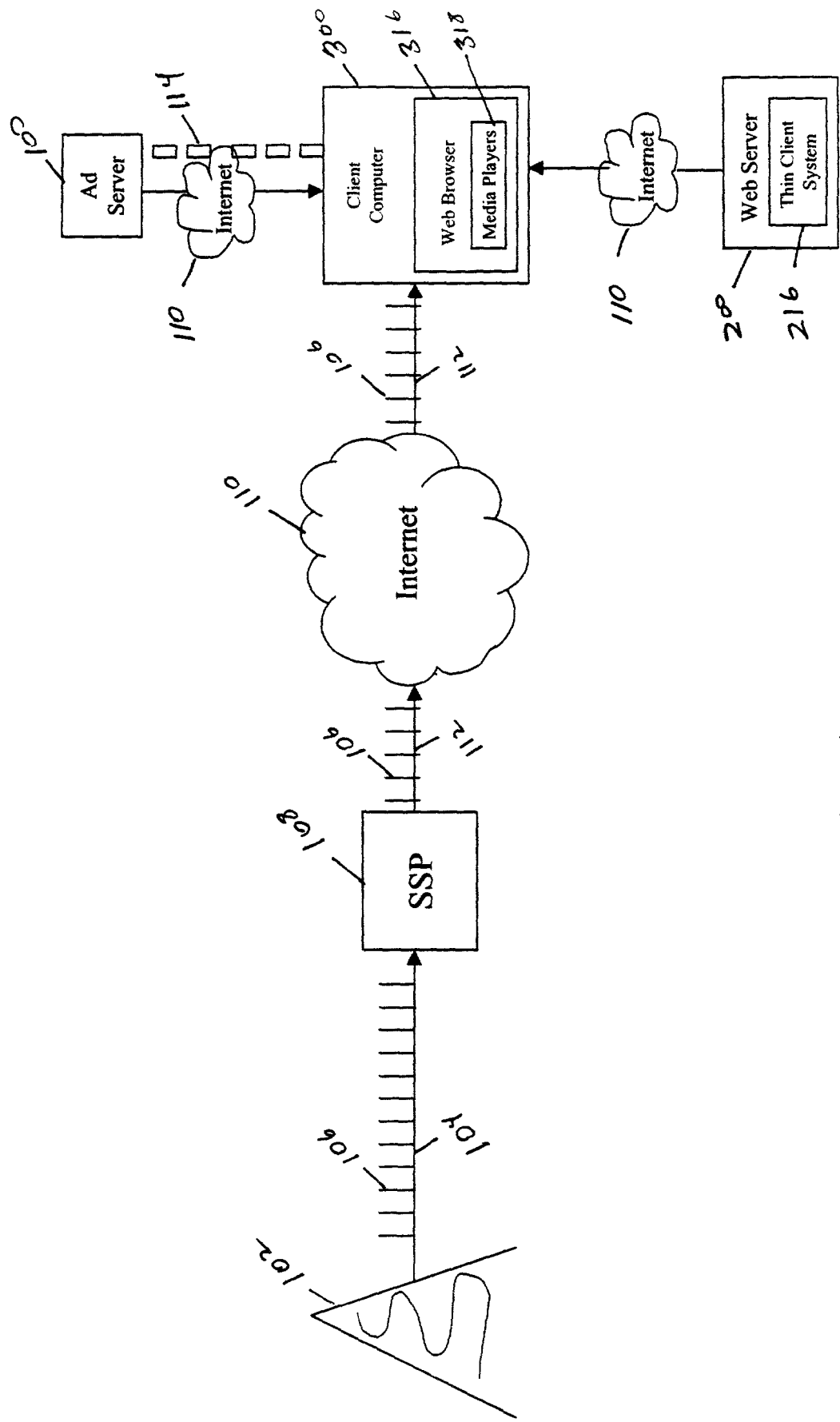
FIG. 1 is a block diagram that illustrates the manner in which untagged data items are inserted into a tagged content stream in accordance with one embodiment of the present invention.

FIG. 1 shows and overview of the process of inserting targeted data items (e.g., advertisements) into a live data stream (e.g., a radio or other signal) or archived/on-demand streams (e.g., a movie stored on a data storage device). However, one skilled in the art will recognize that the invention could insert targeted data items into other media (e.g., in a television signal). For purposes of simplifying the explanation of the process in FIG. 1, the data signal is assumed to be a radio signal.

The Web server computer 200 sends a playback page (not shown) to the Web browser 316 via the Internet 110, and the Web browser 316 displays the playback page at the client computer 300. The playback page is a user interface that allows a user to select radio stations and it provides the functions of an Internet radio station tuner. The playback page also has two or more embedded media players 318. These embedded media players 318 are transparent to users because they perform the function of displaying multimedia content on the client computer 300 without any visible effect.

When the user at the client computer 300 selects a radio station from the playback page, the client computer 300 requests a list of targeted data items (e.g., advertisements, public service announcements, etc.) from the advertisement server 100. This request is in the form of an XML request. The list of data items is referred to herein as the spot list.

The Web server computer 200 then instructs the radio station 102 to begin sending an audio stream 104 to the client computer 300. It is noted that the audio stream 104 can be in the form of a live audio stream or in the form of an archived audio stream that a radio station broadcaster has uploaded from a server.

At the radio station 102, tags 106 are inserted into the audio stream 104 before the audio stream 104 is sent to the client computer 300. This audio stream 104 is a tagged content stream. The tags 106 indicate the point at which original data item (not shown) have been inserted into the audio stream 104. The tags 106 also contain information about whether the original data item is an advertisement and about the length of the data item. The original data items are typically generic data items that are not customized for or targeted to particular users.

The process of sending the audio stream 104 typically involves sending the audio stream 104 to a Streaming Service Provider (SSP) 108. The SSP 108 converts the audio stream 104 and tags 106 into a streaming format 112. The SSP 108 then sends the streaming format 112, together with the tags 106, to the client computer 300 via the Internet 110. An advertisement server 100 selects one or more targeted data items from the spot list and then sends these targeted data items 114 to the client computer 300 via the Internet 110. The targeted data items 114 are contained within an untagged content stream. In FIG. 1, the targeted data items 114 are targeted advertisements. One skilled in the art will recognize that the data items could be other content, such as targeted public service announcements, without exceeding the scope of the present invention.

The ThinClient System 216 at the Web server computer 200 works in conjunction with at least two instances of media player 318 to insert the targeted data items 114 into the streaming format 112. More specifically, when a media player 318 receives a notification from a controlling script of that media player 318 that a tag 106 was found, the ThinClient System 216 causes the original data item contained in the streaming format 112 to be replaced with a targeted data item 114. It is noted that the interaction of the ThinClient System 216 with the media players 318 is transparent to the user.

In brief, the ThinClient System 216 advantageously eliminates the need for downloading advertisement insertion software to the client computer 300. Consequently, users working in corporate environments, or any other environment that prohibits the downloading of software, can listen to Internet radio and view targeted advertisements without downloading software onto a client computer 300.

Before providing the details of the ThinClient System 216, the hardware environments of one embodiment of the present invention are discussed.

Hardware

Figure 2:
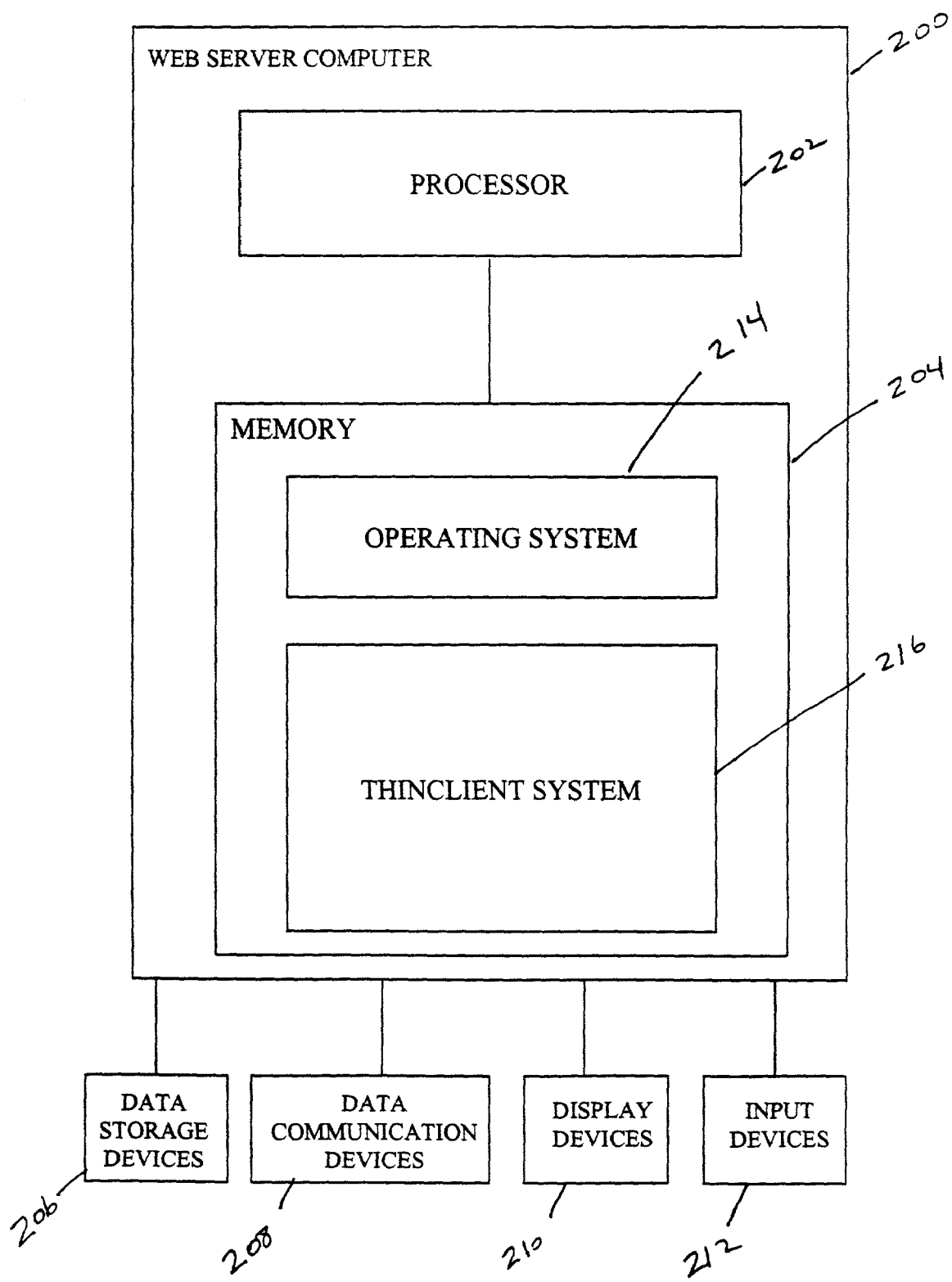
FIG. 2 is a schematic diagram illustrating a hardware environment used to implement a Web server computer in accordance with one embodiment of the present invention.

FIG. 2 is a schematic diagram illustrating a hardware environment used to implement server computers 100 (not shown) and 200 in one embodiment of the invention. Since the hardware of the server computers 100 (not shown) and 200 is essentially the same, the schematic diagram will be discussed in terms of the Web server computer 200.

The Web server computer 200 generally includes a processor 202, a random access memory (RAM) 204, data storage devices 206 (e.g., hard, floppy, and/or CD-ROM disk, drives, etc.) data communications devices 208 (e.g., modems, network interfaces, etc.), display devices 210 (e.g., CRT, LCD display, etc.), and input devices 212 (e.g., mouse pointing device, keyboard, CD-ROM drive, etc.). It is envisioned that attached to the Web server computer 200 may be other devices, such as read only memory (ROM), a video card, bus interface, printers, etc. Those skilled in the art will recognize that any combination of the above components, or any number of different components, peripherals, and other devices, may be used with the Web server computer 200.

The Web server computer 200 operates under the control of an operating system (OS) 214. The operating system 214 is booted into the memory 204 of the Web server computer 200 for execution when the Web server computer 200 is powered-on or reset. In turn, the operating system 214 then controls the execution of one or more computer programs that are included within the ThinClient System 216. The present invention is generally implemented in these computer programs, which execute under the control of the operating system 214, and cause the Web server computer 200 to perform the desired functions as described herein.

As seen in FIGS. 1 and 2, with respect to the advertisement server computer 100, the one or more computer programs are not included within the ThinClient System 216. Instead, the computer programs are included within a system that sends the targeted data items 114 to the client computer 300 (see FIG. 1).

The operating system 214 and the ThinClient System 216 are comprised of instructions which, when read and executed by the Web server computer 200, cause the Web server computer 200 to perform the steps necessary to implement and/or use the present invention. Generally, the operating system 214 and/or ThinClient System 216 are tangibly embodied in and/or readable from a device, carrier, or media such as memory 204, data storage devices 206, and/or data communications devices 208. Under control of the operating system 214, the ThinClient System 216 may be loaded from the memory 204, data storage devices 206, and/or data communications devices 208 into the memory 204 of the Web server computer 200 for use during actual operations.

Thus, the present invention may be implemented as a method, apparatus, or article of manufacture using standard programming and/or engineering techniques to produce software, firmware, hardware, or any combination thereof The term "article of manufacture" (or alternatively, "computer program product") as used herein, is intended to encompass a computer program accessible from any computer-readable device, carrier, or media. Of course, those skilled in the art will recognize many modifications may be made to this configuration without departing from the scope of the present invention.

Those skilled in the art will also recognize that the environment illustrated in FIG. 2 is not intended to limit the present invention. Indeed, those skilled in the art will recognize that other alternative hardware environments may be used without departing from the scope of the present invention.

Figure 3:
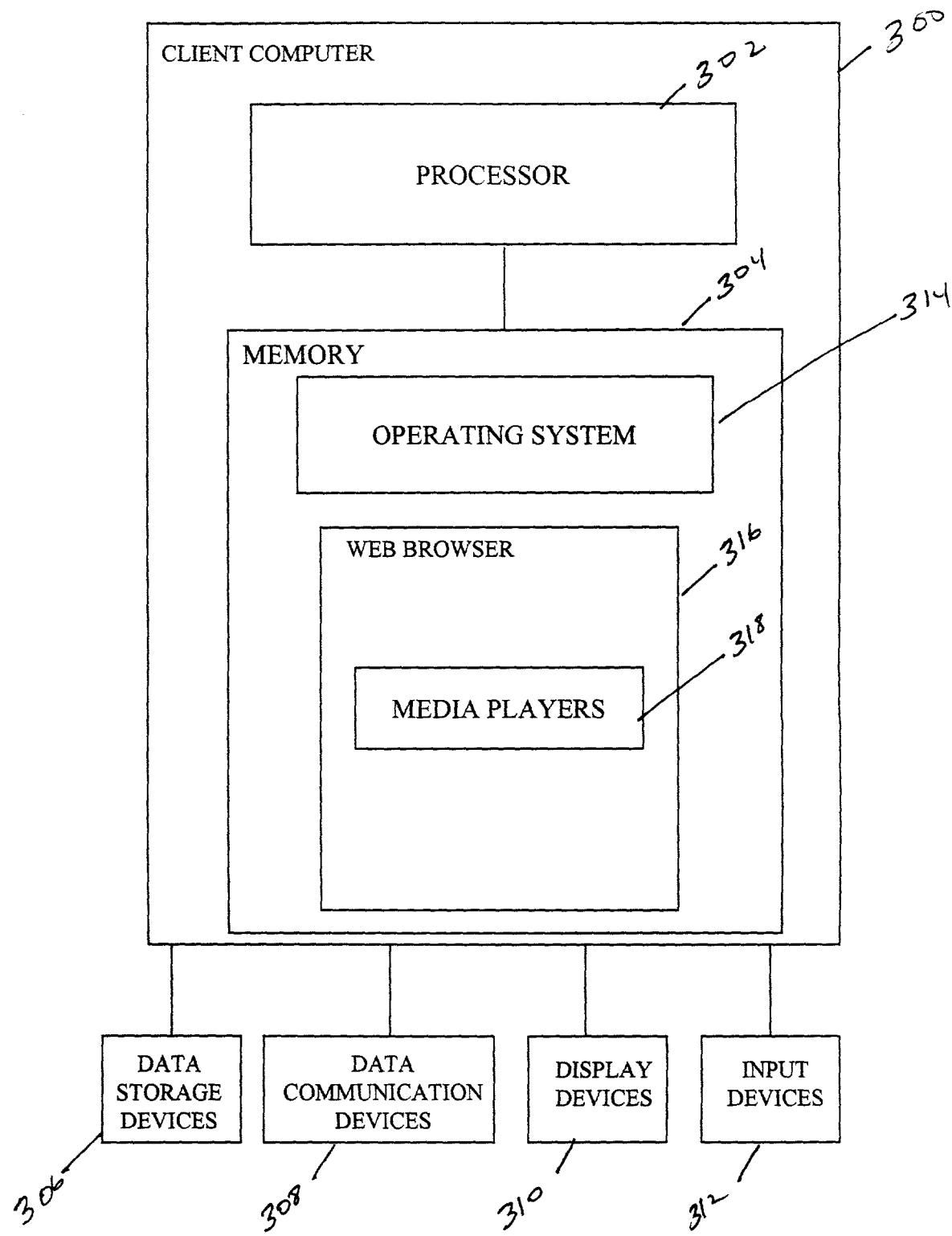
FIG. 3 is a schematic diagram illustrating a hardware environment used to implement a client computer in accordance with one embodiment of the present invention.

FIG. 3 is a schematic diagram illustrating a hardware environment used to implement a client computer 300 in one embodiment of the invention. The present invention is typically implemented using a client computer 300, which generally includes a processor 302, a random access memory (RAM) 304, data storage devices 306 (e.g., hard, floppy, and/or CD-ROM disk, drives, etc.), data communications devices 308 (e.g., modems, network interfaces, etc.), display devices 310 (e.g., CRT, LCD display, etc.), and input devices 312 (e.g., mouse pointing device, keyboard, CD-ROM drive, etc.). It is envisioned that attached to the client computer 300 may be other devices, such as read only memory (ROM), a video card, bus interface, printers, etc. Those skilled in the art will recognize that any combination of the above components, or any number of different components, peripherals, and other devices, may be used with the client computer 300.

The client computer 300 operates under the control of an operating system (OS) 314. The operating system 314 is booted into the memory 304 of the client computer 300 for execution when the client computer 300 is powered-on or reset. In turn, the operating system 314 then controls the execution of the Web browser 316 (e.g., Microsoft Internet Explorer Web Browser, Netscape Web Browser, etc.) and the media players 318 (e.g., Windows Media Player, WinAmp, RealPlayer, etc.). The Web browser 316 and the media players 318 work together to receive and play/display media streams, such as the streaming format 112 shown in FIG. 1.

The present invention is generally implemented using the Web browser 316, and two or more embedded media players 318, which execute under the control of the operating system 314, together with the ThinClient System 216 (see FIG. 2). The Web browser 316, media players 318, and ThinClient System 216 (not shown) work together to cause the client computer 300 to perform the desired functions as described herein.

Those skilled in the art will also recognize that the environment illustrated in FIG. 3 is not intended to limit the present invention. Indeed, those skilled in the art will recognize that other alternative hardware environments may be used without departing from the scope of the present invention. For example, the client computer 300 could be a personal digital assistant (PDA), a cellular telephone or other communication device, wrist watch, stand alone Internet radio, set top box, television system, car radio, mainframe computer, minicomputer, or personal computer. Each of which may be used in various configurations, such as in a local area network. In addition, these other environments may work with each other or may work independently.

ThinClient System Implementation

The ThinClient System 216 (see FIGS. 1 and 2) is implemented using a markup language (e.g., HTML or XML) and other Internet applications (e.g., Javascript and Jscript, or ActiveX). The Internet applications allow users to run the ThinClient System 216 from the Internet, without downloading software to the client computer 300 (see FIGS. 1 and 3). In particular, the ThinClient System 216 provides computer programs that run on the client computer 300 and reside on the Web server computer 200. Therefore, the ThinClient System 216 allows the client computer 300 and the Web server computer 200 to interact as if they were one computer, instead of two separate computers.

Inserting Targeted Advertisements into a Media Stream

The ThinClient system 216 (see FIGS. 1 and 2) sends a playback back page to the Web browser 316 (see FIGS. 1 and 3). The playback page provides for user registration and it provides users with access to radio programming in numerous genres, including music, talk, and news.

When the user accesses the playback page and selects a radio station, the ThinClient system 216 directs the Web browser 316 to determine whether the user is a registered user. If the user is not a registered user, the ThinClient System 216 presents the user with a short questionnaire that requests user registration information (e.g., gender, age, geographic location, etc.). After the user has input the requested information, the Web browser 316 stores the user input in a browser file (commonly referred to as cookie). This registration information is typically collected once, when the user initially accesses the playback page and selects a radio station. The Web browser 216 sends the browser file (or cookie) to the advertisement server computer 100 (see FIG. 1). The advertisement server computer 100 uses the information contained in the browser file (or cookie) to identify targeted data items 114 (see FIG. 1).

With reference to FIG. 1, the advertisement server computer 100 creates a spot list of targeted data items 114 (e.g., advertisements, public service announcements, etc.) by matching the user registration information with one or more targeted data items 114. More specifically, data items are selected by matching demographic information associated with the data items with demographic information associated with the user. For example, if certain data items are directed to 18-25 year old males, when a user's registration information indicates that the user is a male between the ages of 18-24 years old, the advertisement server computer 100 creates a spot list that contains data items for that user.

Figure 4:
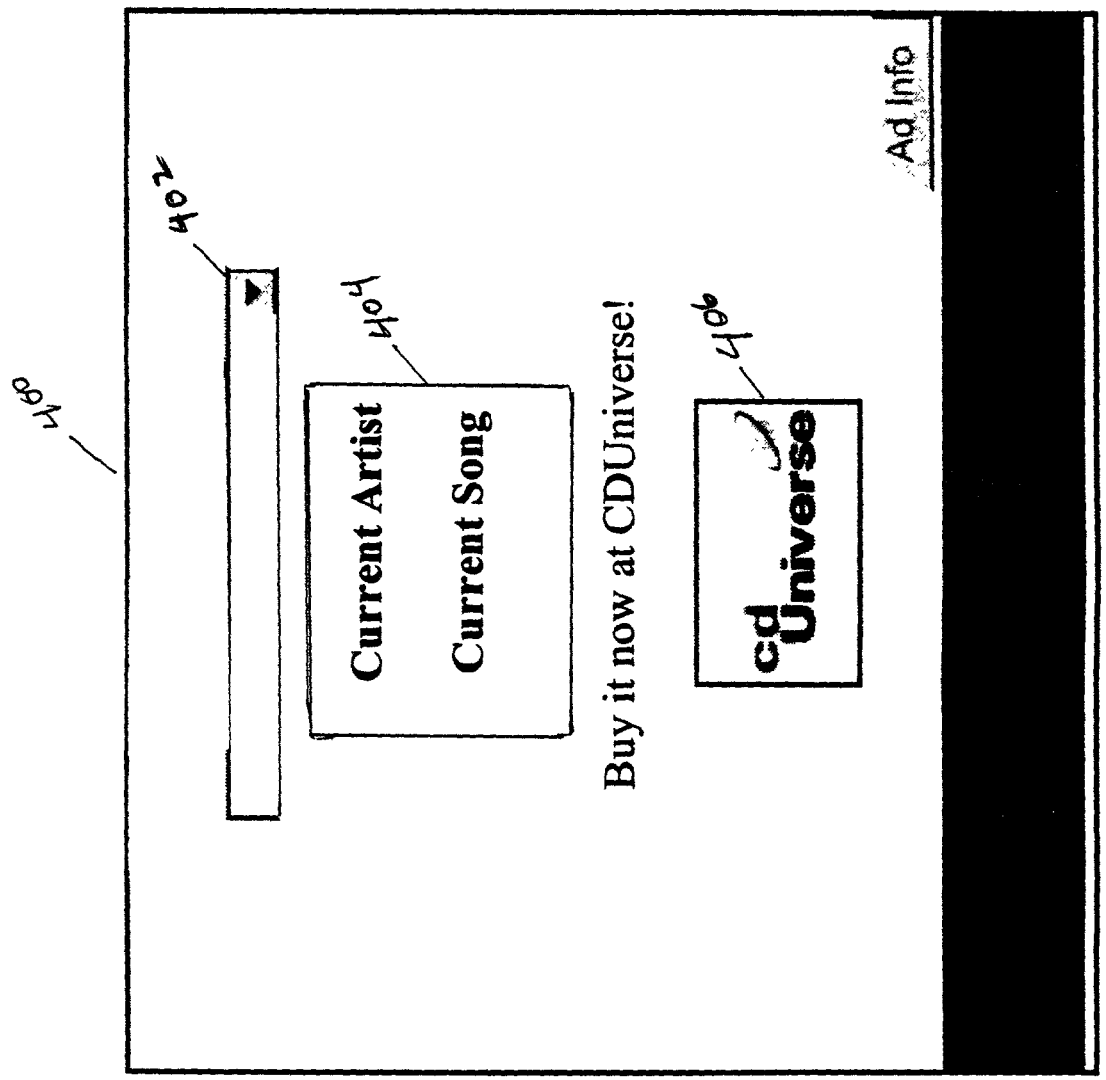
FIG. 4 is a diagram of a playback page in accordance with an embodiment of the present invention.

An exemplary playback page 400 is shown in FIG. 4. The playback page 400 is a user interface that presents the controls for an Internet radio station tuner. The features of the playback page 400 include a radio station selection menu 402 and stop and start buttons (not shown). Additionally, a message panel 404 displays the current artist and current title of the streaming format 112 (see FIG. 1). The playback page 400 also contains a banner display panel 406 that features a dynamically changing banner. Of course, those skilled in the art will recognize that many modifications could be made to the playback page 400 without departing from the scope of the present invention. For example, the playback page 400 could also offer portal-like features such as e-mail, forums, search engines and/or on-line shopping.

Figure 5:
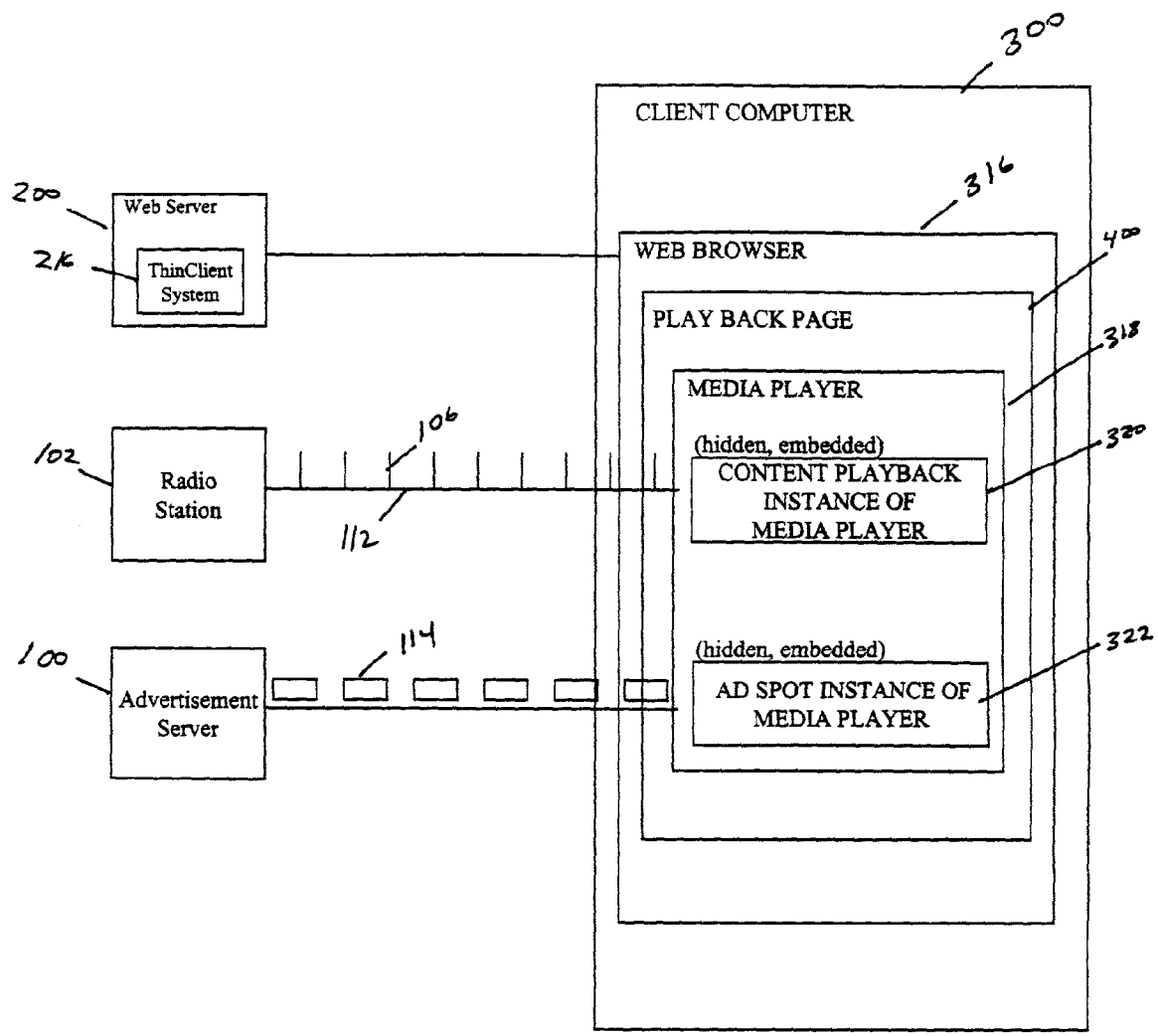
FIG. 5 is a block diagram that illustrates the manner in which the ThinClient System works together with a Content Playback instance of a media player and one Ad Spot instance of a media player to insert an untagged content stream into an tagged content stream in accordance with one embodiment of the present invention.

FIG. 5 is a block diagram that illustrates the manner in which the ThinClient System 216 works together with a Content Playback instance of a media player 320 and one Ad Spot instance of a media player 322 to insert an untagged content stream into an tagged content stream in accordance with one embodiment of the present invention. In FIG. 5, the playback page 400 contains multiple instances of embedded and hidden media players 318. These media players 318 are transparent to the user.

When the user selects a radio station 102 from the playback page 400, the Web server computer 200 directs the radio station 102 to begin sending the audio stream 104 (see FIG. 1), together with the tags 106, which is converted to the streaming format 112. This streaming format 112 is a tagged content stream. The radio station 102 causes the streaming format 112 to be sent to Content Playback instance of the media player 320. The Content Playback instance of the media player 320 displays the streaming format 112 on the client computer 300. Further, the Content Playback instance of the media player 320 has a controlling script that searches for tags 106.

Some of the tags 106 contain artist/title information about a current song contained within the streaming format 112. The ThinClient System 216, directs the Content Playback instance of the media player 320 to pass the artist/title information to the playback page 400 for display to the user. Other tags 106 are advertising break tags that represent the beginning or end of an original data item. An exemplary original data item begin tag 106 that is used with one embodiment of the present invention is shown below:

11:28:43 tag:<T S="P" D="6000"/>Spot Group Selected adding 1783.

In this begin tag 106, 11:28:43 represents the time that the original data item was sent to the client computer 300. The letter T identifies the string of characters as a tag. The letter S represents the state of the tag. The tag can have at least two states: play and end. Here, the state is equal to play, as represented by the letter P. The letter D represents the duration. For this example, the duration is "6000" or sixty seconds. The phrase "Spot Group Selected adding 1783" refers to a particular data item (e.g., advertisement) that was selected from the spot list. More specifically, the number 1783 identifies a particular data item (e.g., advertisement).

An exemplary end tag 106 that is used with one embodiment of the invention is shown below:

11:29:43 tag:<T S="E"/>

In the end tag 106, 11:29:43 represents the time that the original data item ends. The letter T identifies the string of characters as a tag. The letter S represents the state of the tag. Here, the state is equal to end, as represented by the letter E.

When the controlling script of the Content Playback Instance of the media player 320 finds a begin tag 106, the script notifies the Content Playback Instance of the media player 320. The ThinClient system 216 then mutes the Content Playback Instance of the media player 320 and passes control to an Ad Spot Playback instance of the media player 322. When the Content Playback Instance of the media player 320 is muted, the user at the client computer 300 cannot hear or view the streaming format 112 (i.e., the tagged content stream). It is noted that there could be one Ad Spot Playback instance of the media player 322 or multiple Ad Spot Playback instances of the media player 322. FIG. 5 shows an embodiment of the present invention that has only one instance of the Ad Spot Playback instance of the media player 322

Once control is passed to the Ad Spot Playback instance of the media player 322, the ThinClient system 216 causes the Ad Spot Playback instance of the media player 322 to connect to the advertisement server 100. The Ad Spot Playback instance of the media player 322 then begins receiving targeted data items 114 from the advertisement server 100, and displaying targeted data items 114 to the user at the client computer 300. The targeted data items 114 are contained within an untagged content stream. When the controlling script of the Ad Spot Playback instance of the media player 322 notifies the Ad Spot Playback instance of the media player 322 that the end of the targeted data item 114 has been reached, the ThinClient system 216 mutes the Ad Spot Playback instance of the media player 322 and passes control back to the Content Playback instance of the media player 320. When the Ad Spot Playback instance of the media player 322 is muted, the user cannot hear or view the targeted data items 114 (i.e., untagged content stream). The ThinClient system 216 continues alternating between the Content Playback instance of the media player 320 and the Ad Spot Playback instance of the media player 322 until the client computer 300 stops receiving streaming format 112. Such alternation between the Content Playback instance of the media player 320 and the Ad Spot Playback instance of the media player 322 is referred to herein as content stream switching.

Figure 6:
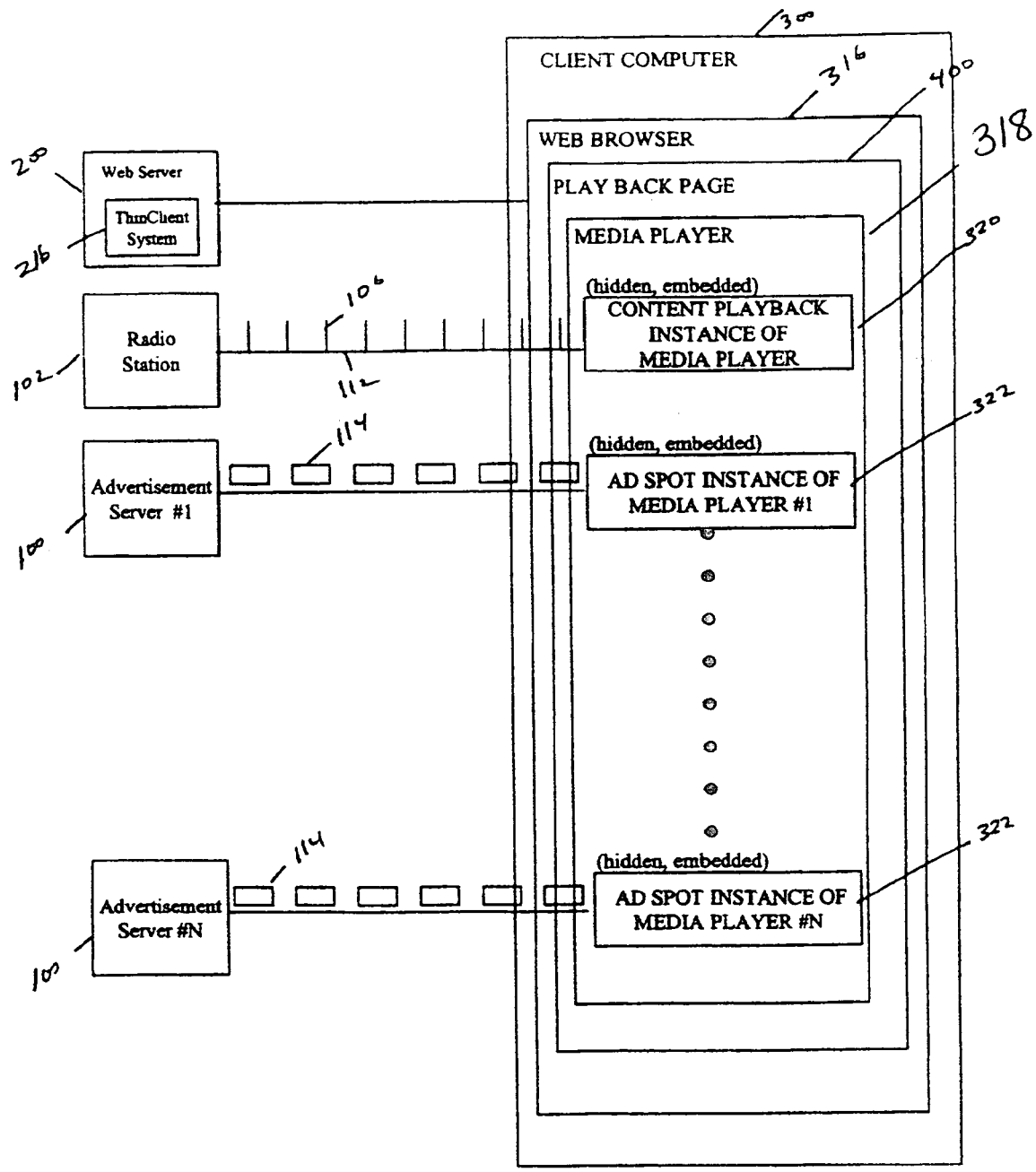
FIG. 6 is a block diagram that illustrates the manner in which the ThinClient System works together with a Content Playback instance of a media player and multiple Ad Spot instances of a media player to insert an untagged content stream into an tagged content stream in accordance with one embodiment of the present invention.

In FIG. 6, the playback page 400 contains multiple Ad Spot Playback instances of the media player 322. In this embodiment of the present invention, when the controlling script of the Content Playback instance of the media player 320 finds a begin tag 106, the script notifies the Content Playback instance of the media player 320. The ThinClient system 216 then mutes the Content Playback instance of the media player 320 and passes control to the next Ad Spot Playback instance of the media player 322 in a queue (not shown). The Advertisement Server 100, Radio Station 102, Web Server 200, Web Browser 318 are generally as discussed in connection with FIG. 5.

The queue is a temporary holding place in the Content Playback instance of the media player 320 that keeps track of which Ad Spot Playback instance of the media player 322 last played a targeted data item 114. For example, assume that the playback page 400 contains N Ad Spot Playback instances of the media player 322. When the first begin tag 106 is found, the Content Playback instance of the media player 320 will pass control to the first instance of the Ad Spot Playback instance of the media player 322. For the second begin tag 106, the Content Playback instance of the media player 320 will pass control to the second instance of the Ad Spot Playback instance of the media player 322. For the third begin tag 106, the Content Playback instance of the media player 320 will pass control to the third instance of the Ad Spot Playback instance of the media player 322. The Content Playback instance of the media player 320 will continue in this manner until it has passed control to each of the N Ad Spot Playback instances of the media player 322. When a (N+1) the tag is found, the Content Playback instance of the media player 320 passes control to the first Ad Spot Playback instance of the media player 322. The Content Playback instance of the media player 320 continues in this manner, alternating between the multiple Ad Spot Playback instances of the media player 322, until the client computer 300 stops receiving the streaming format 112. Such alternation between the Content Playback instance of the media player 320 and the multiple Ad Spot Playback instances of the media player 322 is referred to herein as content stream switching.

Figure 7:
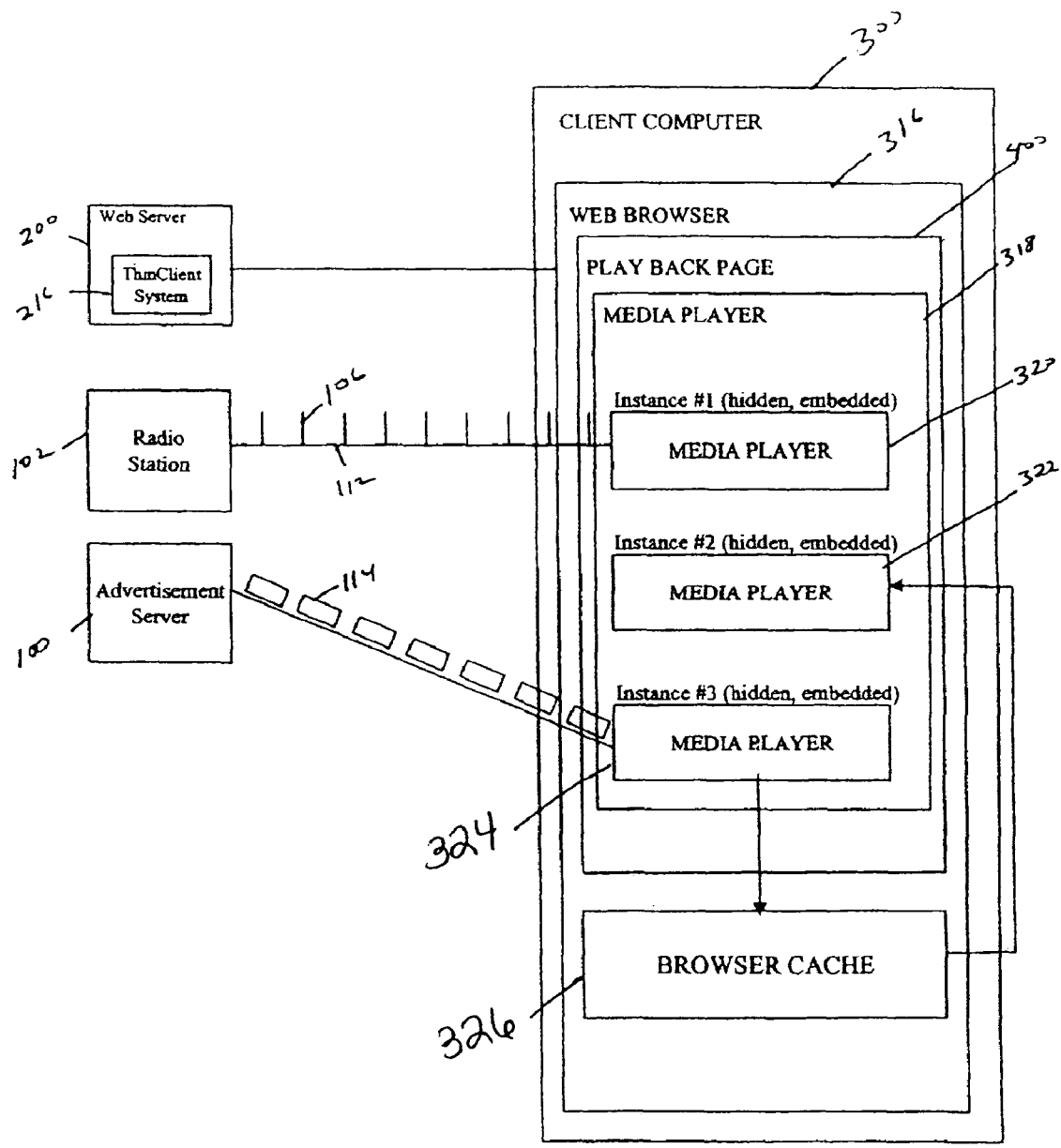
FIG. 7 is a block diagram that illustrates the manner in which the ThinClient System works together with a Content Playback instance of a media player and one Ad Spot instances of a media player and a Spot Caching instance of a media player to insert an untagged content stream into an tagged content stream in accordance with one embodiment of the present invention.

FIG. 7 shows an alternative embodiment of the present invention that has a Spot Caching instance of the media player 324. The Spot Caching instance of the media player 324 receives targeted data items 114 (i.e., untagged content stream), and stores targeted data items 114 (i.e., untagged contact stream) in a browser cache 326. For narrow-band users, this Spot Caching instance of the media player 324 helps to mitigate latency or poor quality data item streaming.

In this embodiment of the present invention, when a user selects a radio station from the playback page 400, the ThinClient System 216 directs the advertisement server computer 100 to send targeted data items 114 (i.e., untagged content stream) to the Spot Caching instance of the media player 326. When the Content Playback instance of the media player 320 finds a begin tag 106 and passes control to an Ad Spot Playback instance of the media player 322, the ThinClient System 216 directs the Ad Spot Playback instance of the media player 322 to retrieve the targeted data items 114 (i.e., untagged content stream) from the browser cache 326. In an alternative embodiment of the present invention, the ThinClient System 216 directs the Ad Spot playback instance of the media player 322 to retrieve the targeted data items 114 (i.e., untagged content stream) from both the browser cache 326 and the advertisement server computer 100. It is noted that the playback page 400 could have one Ad Spot Playback instance of the media player 322 or multiple Ad Spot Playback instances of the media player 322.

Figure 8A:
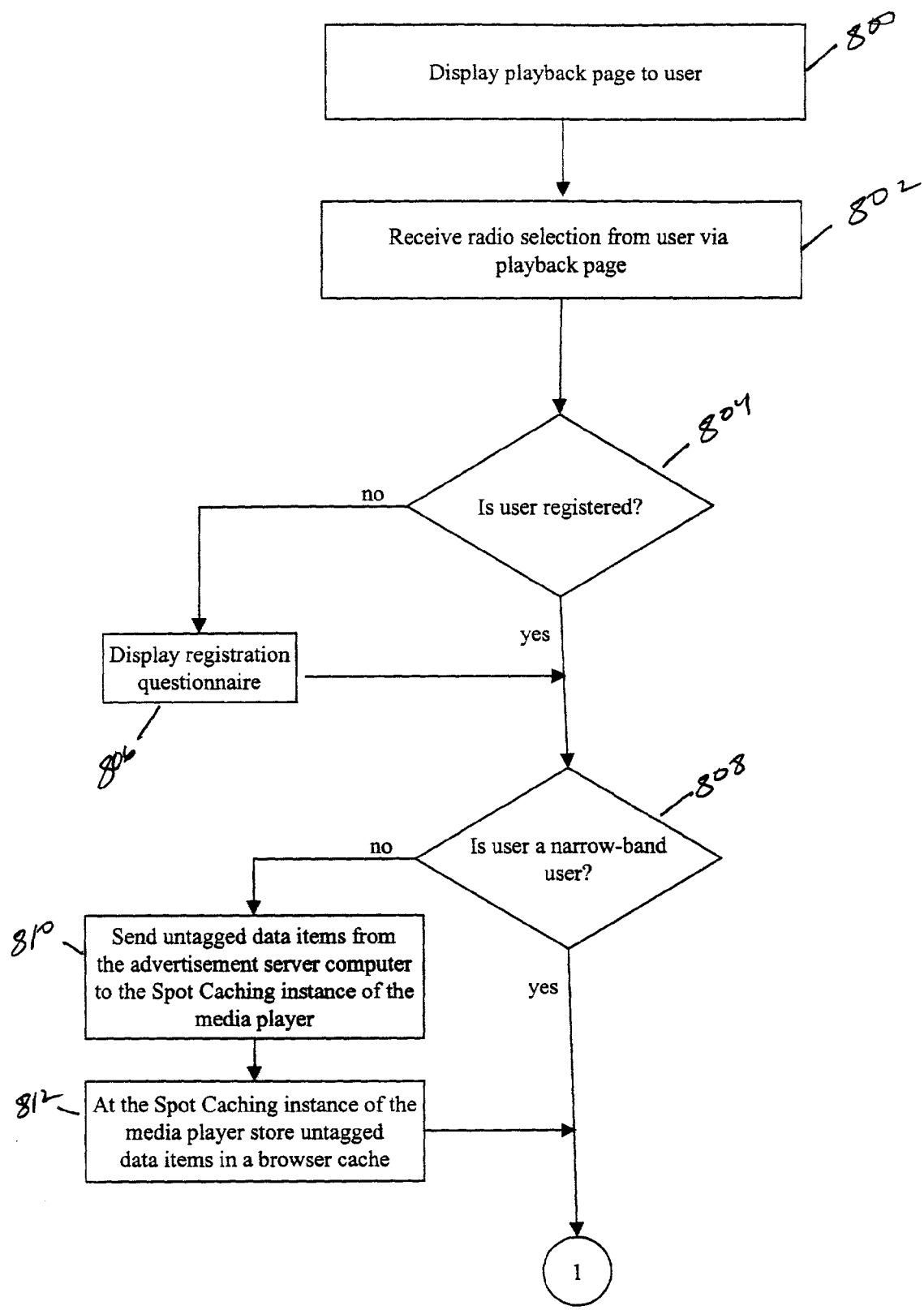
FIGS. 8A-8C are flow diagrams that illustrates the steps performed by the ThinClient System in accordance with one embodiment of the present invention
Figure 8B:
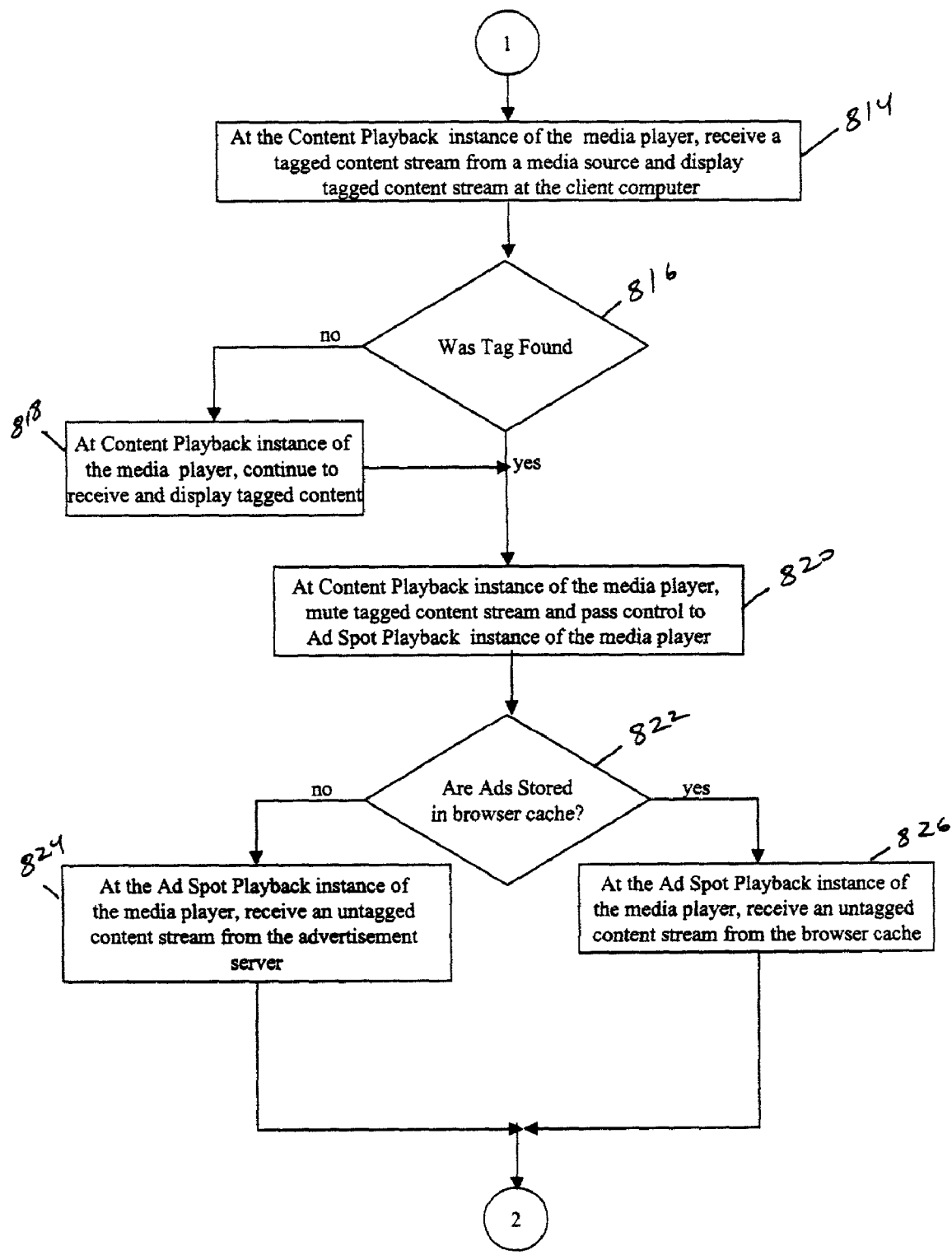
Figure 8C:
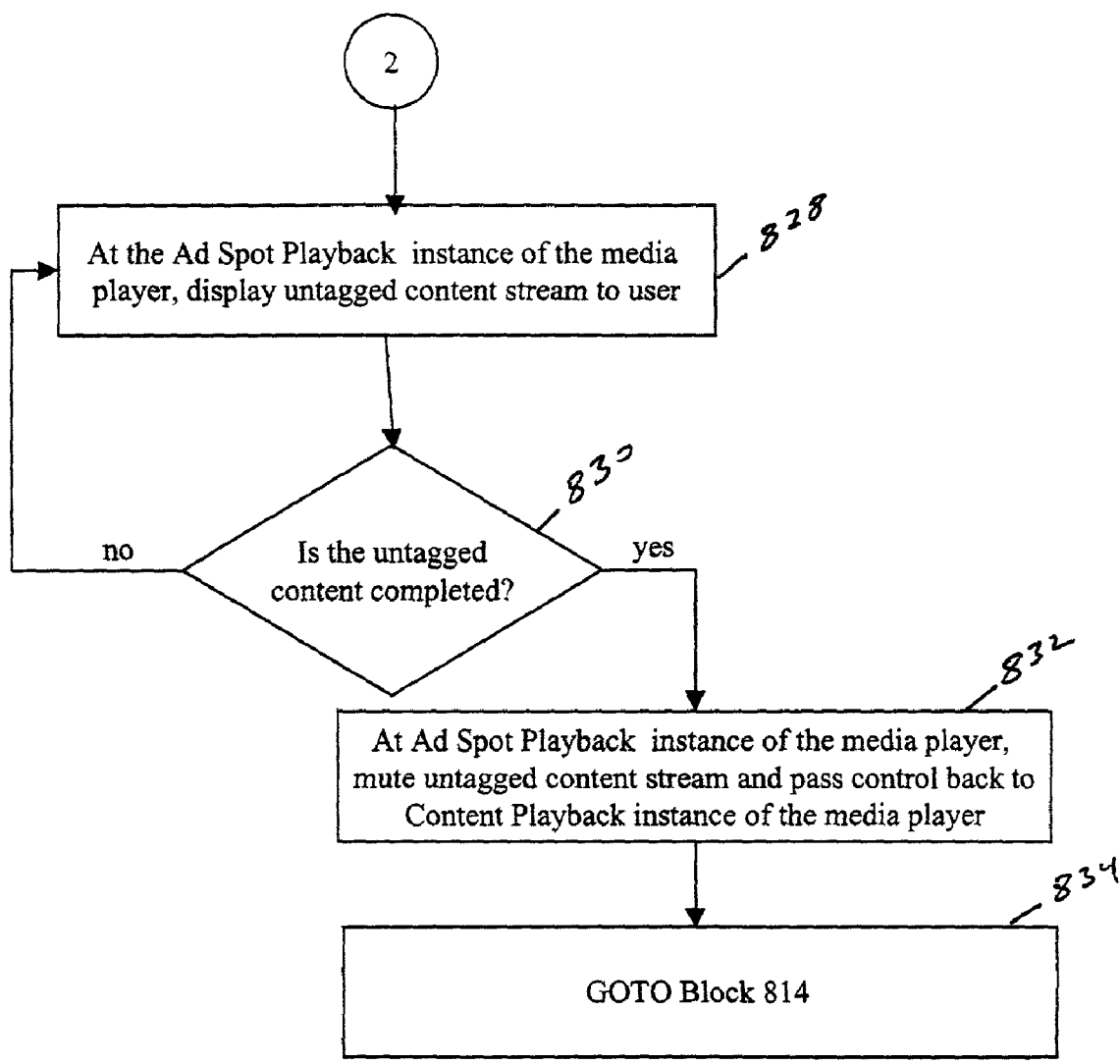

Together FIGS. 8A-8C represent a flowchart that shows the steps performed by the Web browser 316, server computers 100 and 300, the instances of the media players 320, 322, and 324, and the ThinClient System 216 of FIG. 7 in accordance with an embodiment of the present invention. In FIG. 8A, block 800 represents the Web browser 316 displaying the playback page to the user at the client computer 300. The ThinClient System then receives a radio station selection from the use via the playback page, as represented by block 802.

Block 804 is decision block that represents the ThinClient System 216 determining if the user is registered. When the ThinClient System 216 determines that the user in not a registered user, the ThinClient System 216 directs the Web browser 316 to display a registration questionnaire to the user, as represented by block 806. Otherwise, if the ThinClient System 216 determines that the user is a registered user, the ThinClient System proceeds to block 808.

Block 808 is a decisions block that represents the ThinClient System 216 determining whether the user is a narrow-band user. When the user is a narrow band user, the ThinClient System 216 directs the advertisements server computer 100 to send targeted data items 114 (i.e., untagged data items) to the Spot Caching instance of the media player 324, as represented by block 810. The ThinClient System 216 then directs the Spot Caching instance of the media player 324 to store the targeted data items 114 (i.e., untagged data items) in the browser cache 326, as represented by block 812. Otherwise, when the user is not a narrow-band user, the ThinClient System 216 proceeds to block 814 of FIG. 8B.

In FIG. 8B, block 814 represents the Content Playback instance of the media player 320 receiving and displaying the streaming format 112, together with the tags 106 (i.e., tagged content) at the client computer 300.

Block 816 is decision block that represents the Content Playback instance of the media player 320 determining whether a tag 106 was found. When no tag 106 was found, the Content Playback instance of the media player 320 continues to receive and display the streaming format, as represented by block 818. When a tag 106 is found, the ThinClient System 216 mutes the Content Playback instance of the media player 320 and passes control to one of the Ad Spot Playback instances of the media player 322, as represented by block 820.

Block 822 is a decision block that represents the ThinClient System determining whether the data items 114 are stored in the browser cache 326. When the data items 114 are not stored in the browser cache the Ad Spot Playback instance of the media player 322 receives the data items 114 (i.e., untagged content) from the advertisement server 100, as represented by block 824. Otherwise, the Ad Spot Playback instance of the media player receives the data items 114 (i.e., untagged content) from the browser cache 326, as represented by block 826.

In FIG. 8C, the Ad Spot Playback instance of the media player displays the targeted data items 114 (i.e., untagged content), as represented by block 828. Block 830 is a decision block that represents the Ad Spot Playback instance of the media player 322 determining whether the targeted data item 114 (i.e., untagged content) has completed. When the targeted data item 114 (i.e., untagged content) has not completed, control is returned to block 828 and the Ad Spot continues to play the targeted data item 114 (i.e., untagged content). Otherwise, the ThinClient System 216 mutes the Ad Spot Playback instance of the media player 322 and proceeds to block 832. Block 832 represents the ThinClient System passing control back to the Content Playback instance of the media player 320. The ThinClient System then proceeds to block 834. Block 834 represents, the ThinClient System returning to block 814 (see FIG. 8B).

CONCLUSION

The foregoing description of the embodiments of the invention have been presented for the purposes of illustration and description. It is not intended to be exhaustive or to limit the invention to the precise from disclosed. Many modifications and variations are possible in light of the above teaching. It is intended that the scope of the invention be limited not by this detailed description, but rather by the claims appended hereto.

The invention claimed is:

1. A method of processing a content stream at a client computer, comprising:
   sending a playback web page to a web browser using a thin client system located on a first server computer;
   displaying, on the client computer, the playback web page on which a user selects a tagged content stream and submits registration information using a web browser, wherein said playback web page contains multiple instances of embedded and hidden media players;
   receiving registration information from the user;
   identifying targeted data items using a spot list and matching the registration information from the user with one or more targeted data items;
   storing the registration information in a file;
   displaying, on the client computer, the selected tagged content stream received from a media source by using a first media player, wherein the first media player is embedded in the playback web page, where the playback web page is served by the first server computer;
   muting the first media player if the first media player receives notification that a tag was found in the content stream;
   displaying, on the client computer, an untagged content stream, containing the targeted data items from the spot list, received from an advertisement server by using a second media player, wherein the second media player is embedded in the playback web page, said displaying the untagged content stream from the thin client system located on the first server computer passing control from the first media player to the second media player wherein the tagged content stream and the untagged content stream are received from the media source and the advertisement server by the client computer independent of the first server computer;
   muting the second media player if the second media player receives notification that the untagged content stream has ended; and
   displaying, on the client computer, the tagged content stream received from the media source by using the first media player,
   wherein the user runs the thin client system located on the first server computer from the Internet without downloading software to the client computer.

2. The method of claim 1, wherein the media source is a radio station and the tagged content stream is an audio stream.

3. The method of claim 1, further comprising connecting the client computer to a second server computer; wherein the untagged content stream is received from the second server computer.

4. A method of processing a content stream at a client computer, comprising:
   sending a playback web page to a web browser using a thin client system located on a first server computer;
   displaying, on the client computer, the playback web page on which a user selects a tagged content stream and submits registration information using a web browser, wherein said playback web page contains multiple instances of embedded and hidden media players;
   receiving registration information from the user;
   identifying targeted data items using a spot list and matching the registration information from the user with one or more targeted data items;
   storing the registration information in a file;
   displaying, on the client computer, the selected tagged content stream received from a media source by using a first media player, wherein the first media player is embedded in the playback web page, where the playback web page is served by the first server computer;
   muting the first media player if the first media player receives notification that a tag was found in the content stream;
   displaying, on the client computer, an untagged content stream, containing the targeted data items from the spot list, received from an advertisement server by using a second media player, wherein the second media player is embedded in the playback web page, wherein the tagged content stream and the untagged content stream are received from the media source and the advertisement server by the client computer independent of the first server computer;
   storing the untagged content stream in a cache that is connected to the client computer and that stores the entire untagged content stream until such time as the untagged content stream is displayed, wherein the displaying the untagged content stream displays the untagged content stream from the cache;
   muting the second media player if the second media player receives notification that the untagged content stream has ended; and
   displaying, on the client computer, the tagged content stream received from the media source by using the first media player,
   wherein the user runs the thin client system located on the first server computer from the Internet without downloading software to the client computer.

5. A method of content stream switching at a client computer, comprising:
   collecting registration information from a user at the client computer, wherein the collecting includes:
      sending a playback web page to a web browser using a thin client system located on a first server computer;
      displaying, on the client computer, the playback web page on which a user selects a tagged content stream and submits registration information using a web browser, wherein said playback web page contains multiple instances of embedded and hidden media players;
   receiving registration information from the user;
   identifying targeted data items using a spot list and matching the registration information from the user with one or more targeted data items;
   storing the registration information in a file;
   displaying, on the client computer, the selected tagged content stream received from a media source by using a first media player, wherein the first media player is embedded in the playback web page, where the playback web page is served by the first server computer, and the playback web page is displayed via the web browser which is stored on the client computer;
   receiving a targeted untagged content stream including the targeted data items, from an advertisement server, by using a second media player, wherein the targeted untagged content stream is based on the collected registration information, and wherein the second media player is embedded in the playback web page;

muting the first media player if the first media player receives notification that a tag is found in the content stream;

displaying, on the client computer, the targeted untagged content stream by using the second media player, said displaying the targeted untagged content stream being the result of the first server computer passing control from the first media player to the second media player; and muting the second media player if the second media player receives notification that the untagged content stream has ended; and displaying, on the client computer, the tagged content stream received from the media source by using the first media players, wherein the user runs the thin client system located on the first server computer from the Internet without downloading software to the client computer.

6. The method of claim 5, wherein the media source is a radio station and the tagged content stream is a radio stream.

7. The method of claim 5, the untagged content stream is an audio stream containing one or more advertisements.

8. The method of claim 5, further comprising storing the untagged content stream in a cache connected to the client computer by using a third media player, wherein the third media player is embedded in the playback web page and hidden from the user.

9. The method of claim 8, wherein displaying an untagged content stream received from a server computer by using a second media player comprises displaying an untagged content stream received from the cache by using a second media player.

10. A method of content stream switching at a client computer, comprising:
collecting registration information from a user at the client computer, wherein the collecting includes:
sending a playback web page to a web browser using a thin client system located on a first server computer;
displaying, on the client computer, the playback web page on which a user selects a tagged content stream and submits registration information using a web browser, wherein said playback web page contains multiple instances of embedded and hidden media players;
receiving registration information from the user;
identifying targeted data items using spot list and matching the registration information from the user with one or more targeted data items;
storing the registration information in a file;
receiving a targeted untagged content stream from a server by using a first media player, wherein the targeted untagged content stream is based on the collected registration information and includes the targeted data items, and wherein the first media player is embedded in the playback web page, where the playback web page is served by the first server computer;
storing the targeted untagged content stream in a cache that is connected to the web browser by using the first media player;
displaying, on the client computer, a tagged content stream that was received from a media source by using a second media player, wherein the second media player is embedded in the playback web page, and the playback web page is displayed via a web browser which is stored on the client computer;

muting the second media player if the second media player receives notification that a tag was is found; and displaying, on the client computer, the targeted untagged content stream that was received from the cache by using a third media player, wherein the third media player is embedded in the playback web page, said displaying the targeted untagged content stream being the result of the first server computer passing control from the second media player to the third media players wherein the user runs the thin client system located on the first server computer from the Internet without downloading software to the client computer.

11. An apparatus for processing a content stream at a client computer, comprising:
a first server computer;
one or more computer programs including a thin client system, that reside at the first server computer and are executed by the client computer and that:
(a) send a playback web page to a web browser that displays the playback web page on which a user selects a tagged content stream and submits registration information, wherein said playback web page contains multiple instances of embedded and hidden media players;
(b) create a spot list identifying targeted data items by matching the user's submitted registration information with one or more targeted data items and stores the registration information in a file;
(c) display, on the client computer, the selected tagged content stream received from a media source by using a first media player, wherein the first media player is embedded in the playback web page, where the playback web page is served by the first server computer;
(d) mute the first media player if the first media player receives notification that a tag was found;
(e) display, on the client computer, an untagged content stream by using a second media player, wherein the second media player is embedded in the playback web page;
(f) mute the second media player if the second media player receives notification that the untagged content stream has ended; and
(g) display, on the client computer, the tagged content stream by using the first media player,
wherein the user runs the one or more computer programs located on the first server computer, including the thin client system, from the Internet without downloading software to the client computer.

12. The apparatus of claim 11, wherein the media source is a radio station and the tagged content stream is an audio stream.

13. The apparatus of claim 11, further comprising a computer program, that resides at the server computer and is executed by the client computer that stores the untagged content stream in a cache connected to the client computer by using a third media player, wherein the third media player is embedded in the playback web page.

14. The apparatus of claim 11, further comprising a computer program that resides at the server computer and is executed by the client computer that provides a user-interface to access the tagged content stream.

15. The apparatus of claim 14, wherein the user-interface comprises access to a database of radio stations.

* * * * *